US012511604B2

United States Patent
Ghosh et al.

(10) Patent No.: US 12,511,604 B2
(45) Date of Patent: Dec. 30, 2025

(54) USING A PREDICTIVE MACHINE LEARNING TO DETERMINE STORAGE SPACES TO STORE ITEMS IN A STORAGE INFRASTRUCTURE

(71) Applicant: International Business Machines Corporation, Armonk, NY (US)

(72) Inventors: Partho Ghosh, Kolkata (IN); Venkata Vara Prasad Karri, Visakhapatnam (IN); Ramprasad Bhat, Bangalore (IN); Saraswathi Sailaja Perumalla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 17/493,832

(22) Filed: Oct. 4, 2021

(65) Prior Publication Data
US 2023/0105019 A1 Apr. 6, 2023

(51) Int. Cl.
*H04W 4/35* (2018.01)
*G06Q 10/083* (2023.01)

(52) U.S. Cl.
CPC .................. *G06Q 10/083* (2013.01)

(58) Field of Classification Search
USPC .......................................................... 705/28
See application file for complete search history.

(56) References Cited

U.S. PATENT DOCUMENTS

| 10,504,061 B1 * | 12/2019 | Shi .......................... G06N 20/00 |
| 10,540,821 B2 | 1/2020 | Musunuri et al. |
| 10,919,151 B1 * | 2/2021 | Marchese ............ B65G 1/1373 |
| 11,514,766 B1 | 11/2022 | McDaniel et al. |

(Continued)

FOREIGN PATENT DOCUMENTS

| CN | 111858750 A | 10/2020 | |
| CN | 111814828 B * | 5/2024 | ........... G06F 18/214 |

(Continued)

OTHER PUBLICATIONS

Final Office Action dated Feb. 1, 2023, 8pp., for U.S. Appl. No. 17/497,823, (57.524).

(Continued)

*Primary Examiner* — Luna Champagne
(74) *Attorney, Agent, or Firm* — Konrad, Raynes, Davda & Victor LLP; David Victor (57) ABSTRACT

Provided are a computer program product, system, and method for using a predictive machine learning to determine storage spaces to store items in a storage infrastructure. Information on the storage infrastructure indicates storage spaces in the storage infrastructure, including physical configurations of the storage spaces, usages of the storage spaces, items placed in the storage spaces, and a predictive model. The predictive model receives as inputs, attributes of a target item to add to the storage spaces, the physical configuration of the storage spaces, attributes of the storage spaces, and the usages of the storage spaces. The predictive model processes the inputs to output an available storage space to optimize storage of the target item. An augmented reality representation of information on storage of the target item with respect to the available storage space is generated on a computer display.

23 Claims, 7 Drawing Sheets

(56) References Cited

U.S. PATENT DOCUMENTS

| | | | |
|---|---|---|---|
| 11,694,370 | B2 | 7/2023 | Ghosh et al. |
| 2010/0030667 | A1* | 2/2010 | Chudy .................. G06Q 10/08 705/28 |
| 2010/0106555 | A1* | 4/2010 | Mneimneh ......... G06Q 30/0202 705/7.31 |
| 2017/0024838 | A1 | 1/2017 | Kropp |
| 2018/0060765 | A1* | 3/2018 | Hance .................... G05B 15/02 |
| 2019/0132715 | A1* | 5/2019 | Marzouk ................ H04L 67/52 |
| 2019/0149725 | A1 | 5/2019 | Adato et al. |
| 2019/0279426 | A1* | 9/2019 | Musunuri .............. G06V 20/20 |
| 2021/0004756 | A1 | 1/2021 | Kulkarni Wadhonkar et al. |
| 2022/0092685 | A1* | 3/2022 | Taft ...................... G06Q 10/103 |

FOREIGN PATENT DOCUMENTS

| | | | | |
|---|---|---|---|---|
| WO | WO-2021046412 | A1 * | 3/2021 | .......... A61B 5/1114 |
| WO | WO-2022176450 | A1 * | 8/2022 | .......... G06F 3/0346 |

OTHER PUBLICATIONS

List of IBM Patents or Patent Applications Treated as Related, Oct. 12, 2021, 2 pp. [57.521 (Appendix P)].

U.S. Appl. No. 17/497,823, filed Oct. 4, 2021, Invented by Partho Ghosh et al., 41 pp. [57.524 (Appln)].

Ahmed, S.I., "An Efficient System for Searching Frequently Lost Objects Using Binary Detection Sensor", [online], Jan. 2009, Retrieved from the Internet at <URL: https://www.researchgate.net/publication/228871971_An_efficient_system_for_searching_frequently_lost_objects_using_binary_detection_sensor>, 9 pp.

Bobeshko, A., "Object Recognition in Augmented Reality—Virtual Reality Pop", [online], Apr. 17, 2017, [Retrieved on Aug. 28, 2021], Retrieved from the Internet at <URL: https://virtualrealitypop.com/object-recognition-in-augmented-reality-8f7f17127a7a>, 7 pp.

Breen, D.E., "Interactive Occlusion and Automatic Object Placement for Augmented Reality", Computer Graphics Forum, vol. 15, Issue 3, Aug. 1996, 12 pp.

Hook, A., "Ways of Expressing the Placement of Objects in Augmented Reality", [online], Nov. 1, 2018, [Retrieved on Aug. 28, 2021], Retrieved from the Internet at <URL: https://anselm.medium.com/ways-of-expressing-the-placement-of-objects-in-augmented-reality-f5e5d80923ba>, 3 pp.

Immaculate, D.S., et al., "Efficient Detection of Missing Object Using Zigbee Technology", Proceedings of the 2017 IEEE 3rd International Conference on Sensing, Signal Processing and Security (ICSSS), 2017, 5 pp.

Joshi, N., "3 Ways Augmented Reality Can Transform Warehouse Management", [online], Jun. 23, 2019, [Retrieved on Aug. 28, 2021], Retrieved from the Internet at <URL: https://www.allerin.com/blog/3-ways-augmented-reality-can-transform-warehouse-management>, 4 pp.

Office Action dated Oct. 14, 2022, 25 pp., for U.S. Appl. No. 17/497,823, (57.524).

Response dated Dec. 13, 2022, 13 pp., to Office Action for U.S. Appl. No. 17/497,823, (57.524).

Response dated Apr. 3, 2022, 14 pp., to Office Action for U.S. Appl. No. 17/497,823, (57.524).

Notice of Allowance dated Apr. 26, 2023, 11 pp., for U.S. Appl. No. 17/497,823, (57.524).

* cited by examiner

FIG. 10

USING A PREDICTIVE MACHINE LEARNING TO DETERMINE STORAGE SPACES TO STORE ITEMS IN A STORAGE INFRASTRUCTURE

BACKGROUND OF THE INVENTION

1. Field of the Invention

The present invention relates to a computer program product, system, and method for using a predictive machine learning to determine storage spaces to store items in a storage infrastructure.

2. Description of the Related Art

Space planning to store items at home or in a business warehouse can provide significant cost savings when users retrieve items from the storage spaces. Disorganized spaces can cause unnecessary labor costs, poor workflow and management, and lost time. The incorrect use of storage systems and racking arrangements result in many companies and/or homes finding their shelves full, with no space to receive new inventory or their shelves having expired items or too much free space. A disorganized storage space at home or in an industrial warehouse can result in unnoticed expiry of items, increase of stress and frustration to look for items, loss of time, and placement of items at locations inaccessible to users. In an industrial warehouse, forklift operators may spend considerable time searching the warehouse for slots in the storage racking for new inventory. This results in the forklift operator slotting the pallet of inventory wherever they find an empty space. Since the pallet family and size is not carefully considered in its allocation, a large amount of inventory may be slotted in an unorganized manner, with no room to reorganize due to limited warehouse space.

There is a need in the art for improved techniques for organizing and placing items in a storage infrastructure comprised of multiple storage spaces.

SUMMARY

Provided are a computer program product, system, and method for using a predictive machine learning to determine storage spaces to store items in a storage infrastructure. Information on the storage infrastructure indicates storage spaces in the storage infrastructure, including physical configurations of the storage spaces, usages of the storage spaces, items placed in the storage spaces, and a predictive model used to determine storage spaces for items to store in the storage spaces. The predictive model receives as inputs, attributes of a target item to add to the storage spaces, the physical configuration of the storage spaces, attributes of the storage spaces, and the usages of the storage spaces. The predictive model processes the inputs to output an available storage space to optimize storage of the target item. An augmented reality representation of information on storage of the target item with respect to the available storage space is generated on a computer display.

DETAILED DESCRIPTION

Described embodiments provide improvements to computer technology for inventory and storage management by using a predictive model, implementing machine learning and artificial intelligence technology, to process attributes of storage spaces in a storage infrastructure and attributes of a target item to locate in the storage infrastructure to output an optimal storage space for the physical item. In further embodiments, information on an outputted storage space for an item is saved with historical storage space allocation information including a user ranking whether the output storage space was or was not appropriate for the item. This historical storage space allocation information may be used to continually train the predictive model to output storage spaces based on user input on the previously determined storage spaces to increase the likelihood the predictive model outputs a storage space to use for an item that optimizes the storage based on user preferences.

Described embodiments provide further improvements to computer technology for organizing a storage space and inventory by using the predictive model to determine whether items currently stored in the storage space should be rearranged or whether they should be moved for an anticipated event, which could affect optimal storage decisions. Described embodiments provide further use of the predictive model, and the storage space and item information for items stored in the storage spaces to determine whether a user of the infrastructure has a hoarding disorder.

Figure 1:
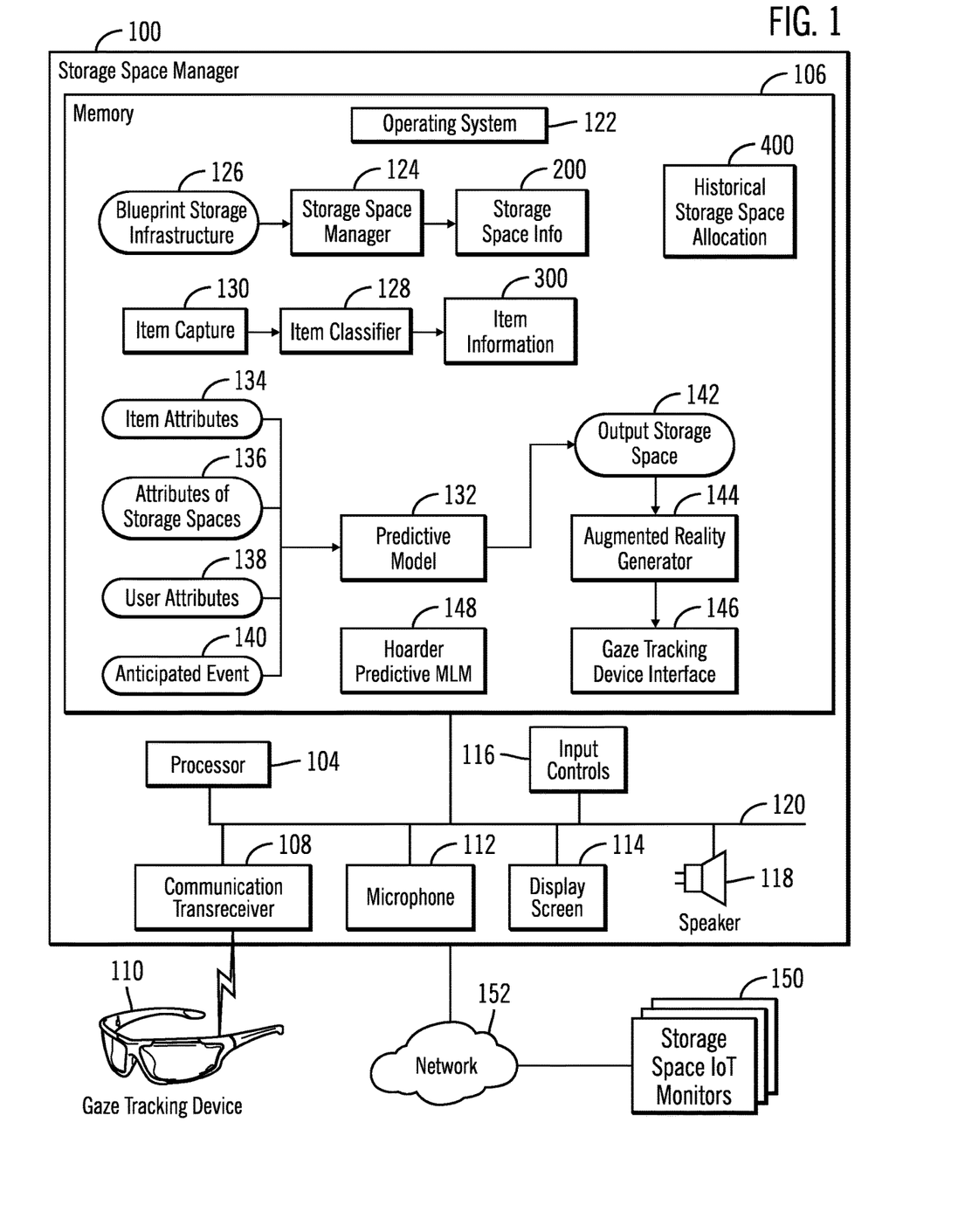
FIG. 1 illustrates an embodiment of a storage space manager interfacing with a gaze tracking device.

FIG. 1 illustrates an embodiment of a storage space manager system 100 to determine storage spaces for items in a storage infrastructure and render augmented reality representations of the placement of items in the storage spaces. The storage space manager system 100 includes a processor 104, a main memory 106, a communication transceiver 108 to communicate (via wireless communication or a wired connection) with external devices, including a wearable gaze tracking device 110; a microphone 112 to receive as input sound external to the storage space manager 100; a display screen 114 to render display output to a user of the storage space manager 100; a speaker 116 to generate sound output to the user; input controls 118 such as buttons and other software or mechanical buttons, including a keyboard, to receive user input. The components 104-118 may communicate over one or more bus interfaces 120.

The gaze tracking device 110 includes computer display capabilities to display information and augmented reality representations from the storage space manager 100, including to project augmented reality representations on the gaze tracking device 110 glass or display for the user to view.

The main memory 106 may include various program components including an operating system 122 to manage the storage space manager 100 operations and interface with device components 104-118; a storage space manager program 124 to manage the storage space and generate storage space information 200 for storage spaces identified in a blueprint for the storage infrastructure 126; an item classifier 128 to receive as input an item capture 130, such as an image of a physical item to store in the storage infrastructure, textual description, voice description, etc., and generate item information 300 having information on the item; and a predictive model 132, which may comprise a machine learning module.

The predictive model 132 receives as input item attributes 134 from the item information 300 for a target item to place or continue storing in the storage infrastructure, attributes of storage spaces 136 from the storage information 300, optional user attributes 138 of one or more users accessing the target item in the storage space, and an optional anticipated event 140 that may affect the storage infrastructure, such as a party, weather event, civil unrest, etc. The predictive model 132 processes the received inputs and outputs a storage space 142 in which to optimize placement of the item.

The memory 106 further includes an augmented reality generator 144 to generate an augmented reality representation of the target item overlayed over the output storage space 142; a gaze tracking device interface 146 to interface with the gaze tracking device 110 to render augmented reality representations of items overlayed in the storage spaces of the storage infrastructure; and a hoarder predictive machine learning module ("MLM") 148 to receive as inputs 134 and 136 to output a prediction whether the user of a storage infrastructure suffers from a hoarding disorder.

The storage space manager 100 may receive sensed information on the storage spaces, such as temperature, humidity, light exposure from storage space Internet of Things (IoT) monitors 150 over a network 152. The attributes of the storage spaces in the storage space information 200 may be updated with sensed information from the storage space (IoT) monitors 150. The IoT monitors 150 monitoring the storage spaces may include cameras and sensors to sense temperature, humidity, light exposure.

The term "augmented reality" as used herein refers to augmented reality, mixed reality, and other visual representations in which augmented reality images and information are rendered overlayed on a real world field of view.

In certain embodiments, the item classifier 128, the predictive model 132, and the hoarder predictive MLM 148 may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce the output storage space 142 or indication of a hoarder disorder. In backward propagation used to train a neural network machine learning module, biases at nodes in the hidden layer are adjusted accordingly to produce the output storage space 142 or hoarder disorder indication having specified confidence levels based on the input parameters, such as item attributes 134, storage space attributes 136, user attributes 138, and anticipated events 140. Backward propagation may comprise an algorithm for supervised learning of artificial neural networks using gradient descent. Given an artificial neural network and an error function, the method may calculate the gradient of the error function with respect to the neural network's weights and biases.

In backward propagation used to train a neural network machine learning module, such as the predictive model 132 and the hoarder predictive MLM 138, margin of errors are determined based on a difference of the calculated predictions and user rankings of the output storage spaces 142 and, for the hoarder prediction, differences of the calculated decision on the hoarder disorder and a judgment by a suitable medical professional. Further, information on whether the user placed an item in the output storage space 142 recommended for the item may be used to modify the confidence levels of the output storage spaces 142 based on the inputs 134, 136, and optionally 138, 140. Biases at nodes in the hidden layer are adjusted accordingly to decrease the confidence levels for the output storage spaces 142 in which the user does not place the items and increase the confidence levels for the output storage spaces 142 in which the user did place the items.

In an alternative embodiment, the components 128, 132, and 148 may be implemented not as a machine learning module, but implemented using a rules based system to determine the outputs from the inputs. The components 128, 132, and 148 may further be implemented using an unsupervised machine learning module, or machine learning implemented in methods other than neural networks, such as multivariable linear regression models.

The arrows shown in FIG. 1 between the components and objects in the memory 106 represent a data flow between the components.

The storage space manager 100 may comprise a smart phone, personal digital assistance (PDA), smartwatch or stationary computing device capable of processing user information observed through the gaze tracking device 110. In further implementations, the storage space manager 100 may be integrated in the electronics of the gaze tracking device 110.

The storage space manager 124 may also generate historical storage space allocations 400 having inputs 134, 136, 138, 140 used by the predictive model 132 to produce an output storage space 142, and indicate a user ranking of the output storage space 142 suggested for a target item. For hoarder disorder predictions, the generated historical storage space allocation 400 may include the inputs 134, 136 and an output hoarder disorder indication, and a user ranking of that decision.

The transceiver 108 may include Bluetooth, Wi-Fi, cellular, and/or other communication technologies. (Bluetooth is a registered trademark of Bluetooth SIG, Inc., WIFI is a trademark of the Wi-Fi Alliance)

The memory 106 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowirebased non-volatile memory, magnetoresistive random-access memory (MRAM), and other electrically erasable programmable read only memory (EEPROM) type devices, hard disk drives, removable memory/storage devices, etc.

The bus 120 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Generally, program modules, such as the program components 122, 124, 128, 132, 144, 146, 148 may comprise routines, programs, objects, components, logic, data structures, and so on that perform particular tasks or implement particular abstract data types. The program modules may be practiced in distributed cloud computing environments where tasks are performed by remote processing devices that are linked through a communications network. In a distributed cloud computing environment, program modules may be located in both local and remote computer system storage media including memory storage devices.

The program components and hardware devices of the storage space manager 100 of FIG. 1 may be implemented in one or more computer systems. If they are implemented in multiple computer systems, then the computer systems may communicate over a network.

The program components 122, 124, 128, 132, 144, 146, 148 may be accessed by the processor 104 from a memory 106 to execute. Alternatively, some or all of the program components 122, 124, 128, 132, 144, 146, 148 may be implemented in separate hardware devices, such as Application Specific Integrated Circuit (ASIC) hardware devices.

The functions described as performed by the program components 122, 124, 128, 132, 144, 146, 148 may be implemented as program code in fewer program modules than shown or implemented as program code throughout a greater number of program modules than shown.

A storage infrastructure is comprised of physical storage spaces, such as shelves, containers, cabinets, lockers, safes, secure rooms, rooms, crawl spaces, refrigerators, etc., that may be located in one or more rooms or floors of a building, or comprise an entire warehouse having numerous shelves and other storage areas.

In certain embodiments, the storage space information 200, item information 300, and historical storage space allocations 400 may be implemented as part of a virtual representation of the storage infrastructure, such as the case with a digital twin. In such implementations, the predictive model 132 may be part of the digital twin of the physical storage infrastructure to accurately reflect the physical storage spaces and items stored in the storage spaces to simulate how items may be stored in the storage infrastructure. The described embodiments may integrate with a digital twin of the object to simulate various scenarios for placing items in storage spaces, such as the International Business Machines® Digital Twin technology. The predictive model 132 for the digital twin may perform item placement simulation based on various parameters, such as, but not limited to, the storage space information 200, item information 300, and historical storage space allocations 400. (International Business Machines is a trademark of International Business Machines Corporation throughout the world).

Figure 2:
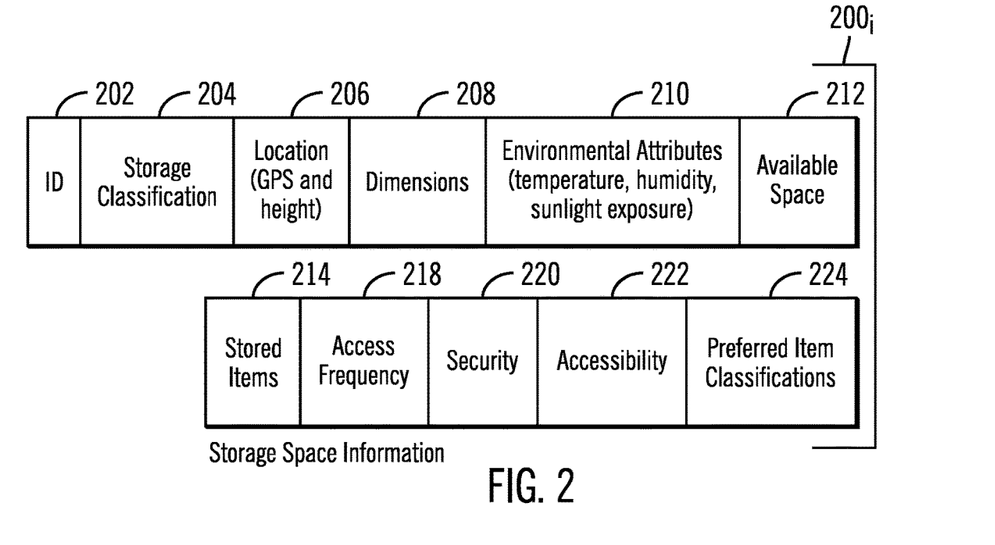
FIG. 2 illustrates an embodiment of storage space information for a storage space in a storage infrastructure.

FIG. 2 illustrates an embodiment of an instance of storage space information $200_i$ for a storage space in a storage infrastructure, such as a shelf, box, locker, cabinet, etc., and includes a unique identifier (ID) 202; a storage classification 204 of the storage, such as cabinet, shelf, box, room, etc.; a location 206, such as a GPS location and a height of the storage space, such as a shelf height; dimensions 208 of the storage space in which items may be placed; environmental attributes 210 of the storage space, such as temperature, humidity, sunlight exposure, etc., which may be updated from information from the storage space IoT monitors 150; available space 212 in the storage space 202; items 214 stored in the storage space 202; an access frequency 218 indicating a frequency or number of accesses of items stored in the storage space 202; a security level 220 of the storage space, such as locked, alarm coverage, safe, etc.; accessibility 222 or ease of access and visibility of the storage space; preferred item classifications 224 of items preferred to store in the storage space 202, which may be provided by the users of the storage infrastructure or based on uses from other users.

With the described embodiments, the storage spaces can be associated with a unique identifier tagged with a dynamic virtual tag or label that can be remotely sensed by the system. In certain embodiments, when an item is removed and then returned to a storage space, the item information may reenforce an established relationship between the storage space and the item over a period of time to understand a particular storage space is intended for a particular object. An established relationship between an item and a storage space may be reflected in the preferred item classifications 224 for the storage space.

Figure 3:
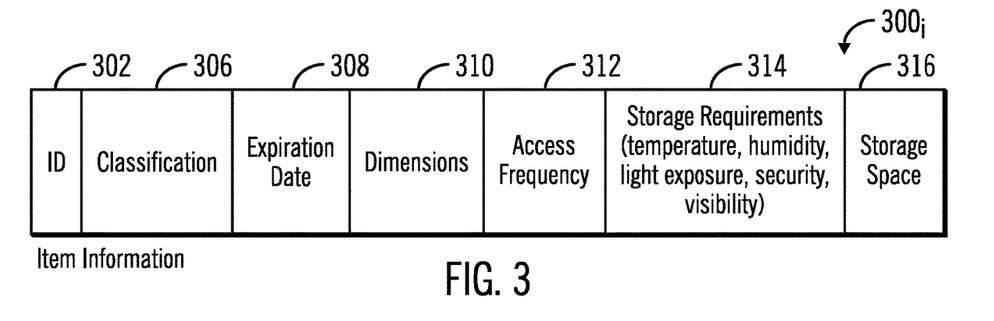
FIG. 3 illustrates an embodiment of item information for items placed in the storage spaces.

FIG. 3 illustrates an embodiment of an instance of item information $300_i$ for an item stored or to store in the storage infrastructure, and includes: a unique ID 302 of an item; a classification 306, such as determined by the item classifier 128; an expiration date 308 if the item is perishable; physical dimensions 310 of the item; an access frequency 312 indicating a frequency at which the item is accessed when placed in a storage space or a predetermined access frequency 312 based on experiences in other storage infrastructures; storage requirements 314, such as temperature, humidity, light exposure, security, visibility, etc.; and a storage space 316 in which the item 302 is placed.

When an item is first received to add to the storage infrastructure, the item classifier 128 may classify the item and generate item information $300_i$ having information predetermined for the classified item, such as the expiration date 308, dimensions 310, a historical access frequency 312 determined from when the item is stored in other storage infrastructures; and the storage requirements 314. When the item is added to the storage space, the access frequency 312 may be cleared to measure the frequency while stored in a storage space.

Figure 4:
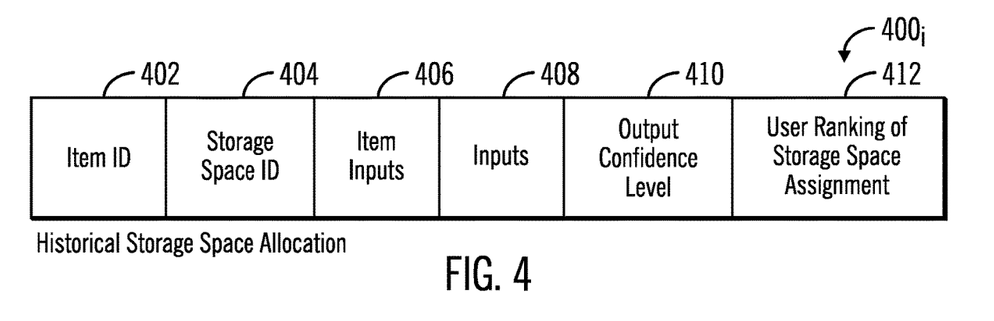
FIG. 4 illustrates an embodiment of a historical storage space allocation of an output storage space outputted by a predictive model based on attributes of the storage spaces and an item to place in the storage infrastructure.

FIG. 4 illustrates an embodiment of an instance of a historical storage space allocation $400_i$ determined after the predictive model 132 determines an output storage space 142 by processing inputs 134, 136, 138, and 140, and includes: an item ID 402 of the item subject to the output storage space 142 determination; the output storage space ID 404 outputted by predictive model 132; the inputs 408, e.g., 134, 136, 138, and 140, to the predictive model 132; an output confidence level 410 produced by the predictive model 132 of the confidence level of the output storage space 142 being optimal for the item; and a user ranking of the storage space assignment for the item, such as a high or low ranking indicating whether a user of the storage space finds the storage space assignment for the item acceptable or useful.

The information arranged in data structures $200_i$, $300_i$, and $400_i$ may be arranged in a different number of data structures and the data structures may include additional information relevant to items and storage spaces.

The historical storage space allocation $400_i$ may be used to determine positive and negative training sets to use to train the predictive model 132 to adjust the outputted confidence level 410 based on the user ranking of the storage space assignment or to adjust other parameters used to output the output storage space 142.

The historical storage space allocation information 400 may be gathered from storage space managers 100 deployed at different storage infrastructures to train the predictive model 132 and hoarder predictive MLM 148 from a wider data space of usage of the predictive models 132, 148 to improve the training of the models 132, 148 using a larger data set.

Figure 5:
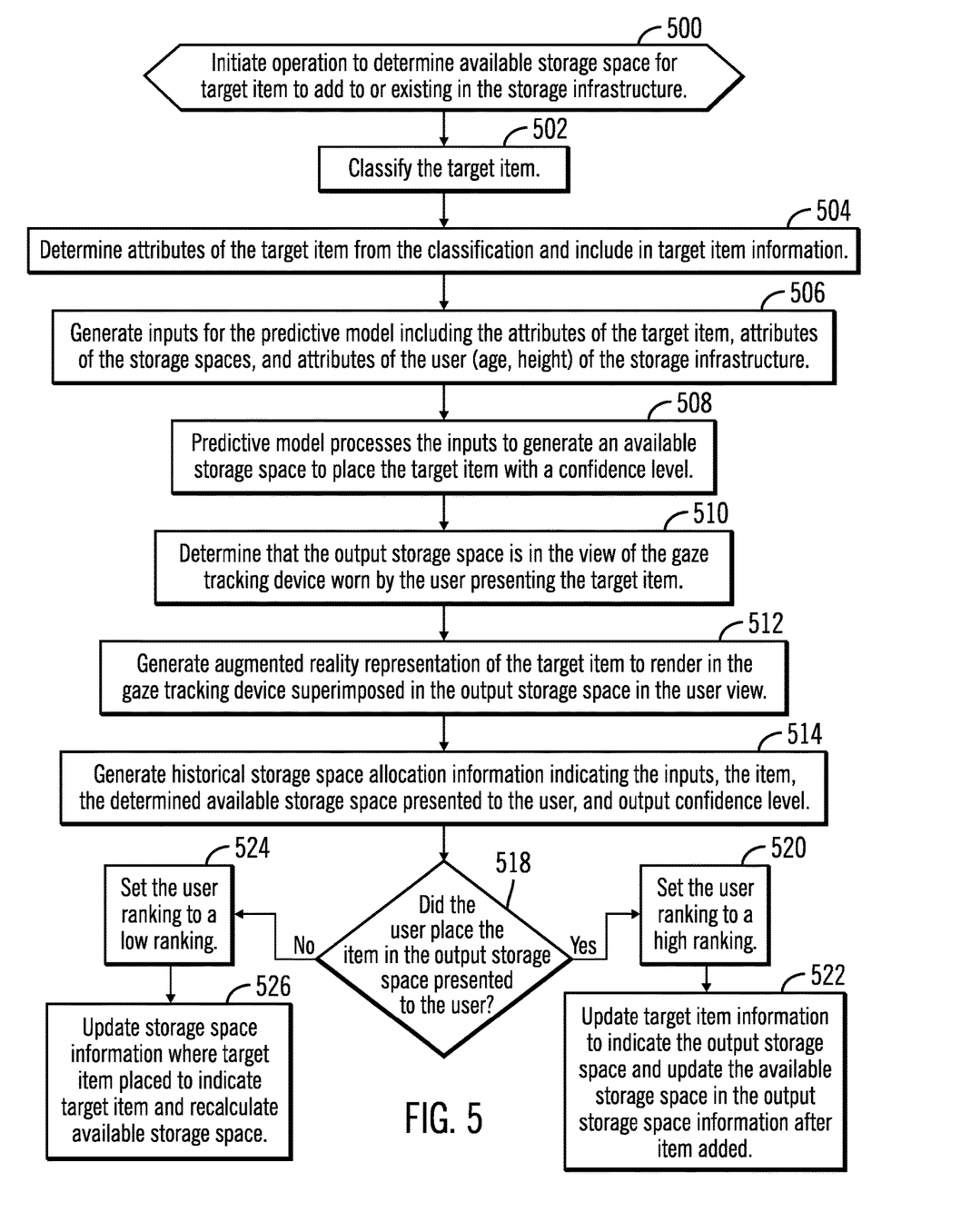
FIG. 5 illustrates an embodiment of operations to determine available storage space for a target item to add or already placed in the storage infrastructure.

FIG. 5 illustrates an embodiment of operations performed by the storage space manager program 124, item classifier 128, predictive model 132, and augmented reality generator 144 to determine an output storage space 142 to use for a target item, which may comprise an item to add to the storage infrastructure or an item currently stored in the storage infrastructure for which item information $300_i$ already exists, and generate an augmented reality presentation on the placement of the target item in the storage space. Upon initiating (at block 500) an operation to determine an available storage space for a target item to add or already existing in the storage infrastructure, the storage space manager 124 may call the item classifier 128 to classify (at block 502) the target item if the target item is a new item to add to the storage infrastructure. The storage space manager 124 determines (at block 504) attributes of the target item from the classification and includes in target item information $300_i$ being generated for a target item to add to the storage infrastructure. The storage space manager program 124 generates (at block 506) inputs for the predictive model 132 including the item attributes 134 of the target item from the item information $300_i$, attributes of the available storage spaces 136, attributes of the users 138 using the storage infrastructure. The storage space manager 124 calls the predictive model 132 to process (at block 508) the inputs to generate an available output storage space 142 for the target item with a confidence level, indicating a likelihood the output is correct or will be acceptable to the user. In certain embodiments, the predictive model 132 may generate multiple output storage spaces with different confidence levels for the user to consider where to place the target item.

The storage space manager 124 and/or gaze tracking device interface 146 determines (at block 510) that the output storage space 142 is in the view of the gaze tracking device 110 worn by the user presenting the target item. The augmented reality generator 144 may generate (at block 512) an augmented reality representation of the target item for the gaze tracking device interface 146 to render in the gaze tracking device 110 as superimposed in the output storage space 142 to show the user where to place the target item. The storage space manager 124 may further generate (at block 514) historical storage space allocation information $400_i$ indicating the inputs 134, 136, 138, information on the target item, the output storage space 142 presented to the user, and the output confidence level 410.

If (at block 518) the user placed the target item in the output storage space 142 presented to the user, which may be detected by the gaze tracking device 110, then the user ranking 412 is set (at block 520) to a high ranking. The storage space manager 124 may update (at block 522) the target item information $300_i$ to indicate the output storage space 142 in field 316 and update the available storage space 212 in the output storage space information $200_i$ after the item is added to the storage space. If (at block 518) the user did not place the target item in the output storage space 142 presented to the user, then the user ranking 412 is set (at block 524) to a low high ranking. The storage space manager 124 may update (at block 526) the target item information $300_i$ to indicate the output storage space 142 in field 316 in which the item is alternatively placed and update the available storage space 212 in the output storage space information $200_i$ after the item is added to the storage space in which the item is placed, which differs from the output storage space 142.

With the embodiment of operations of FIG. 5, the predictive model 132 receives, as input, information on a target item and the storage spaces in the storage infrastructure, and optionally information on a user using the storage infrastructure, to determine optimal storage spaces in which the item may be placed. Further, described embodiments may set a ranking of the output storage space 142 based on whether or not the user places the target item in the output storage space 142, or a user supplied ranking. This historical information may be used to retrain the predictive model 132.

Figure 6:
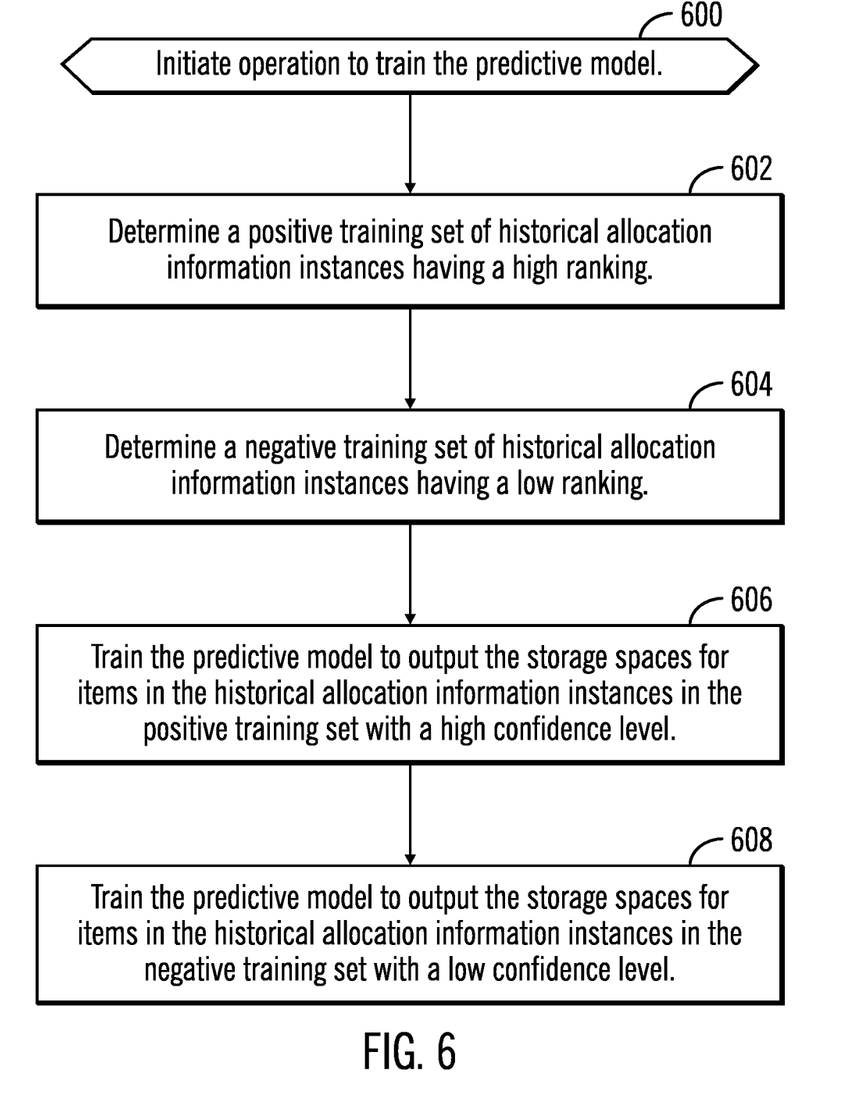
FIG. 6 illustrates an embodiment of operations to train the predictive model.

FIG. 6 illustrates an embodiment of operations performed by the storage space manager program 124 and predictive model 132 to train the predictive model 132 based on historical storage space allocation information $400_i$ gathered when running the predictive model 132 in FIG. 5 or provided by predictive models 132 operating in other storage infrastructures. Upon initiating (at block 600) an operation to train the predictive model 132, the storage space manager 124 may determine a positive training set of historical allocation information instances $400_P$ having a high ranking 412 and determine (at block 604) a negative training set of historical allocation information instances $400_N$ having a low ranking 412. The predictive model 132 is trained (at block 606) to output the storage spaces for items in the historical allocation information instances $400_P$ in the positive training set with a high confidence level. The predictive model 132 is trained (at block 608) to output the storage spaces for items in the historical allocation information instances $400_N$ in the negative training set with a low confidence level.

For artificial neural network program implementations of the predictive model 132, the predictive model 132 may be trained using backward propagation to adjust weights and biases at nodes in a hidden layer to produce the computed output. In backward propagation used to train a neural network machine learning module, biases at nodes in the hidden layer are adjusted accordingly to produce the output storage space 142 having specified confidence levels based on the input used to previously produce the output 142. Backward propagation may comprise an algorithm for supervised learning of artificial neural networks using gradient descent. Given an artificial neural network and an error function, the method may calculate the gradient of the error function with respect to the neural network's weights and biases.

Figure 7:
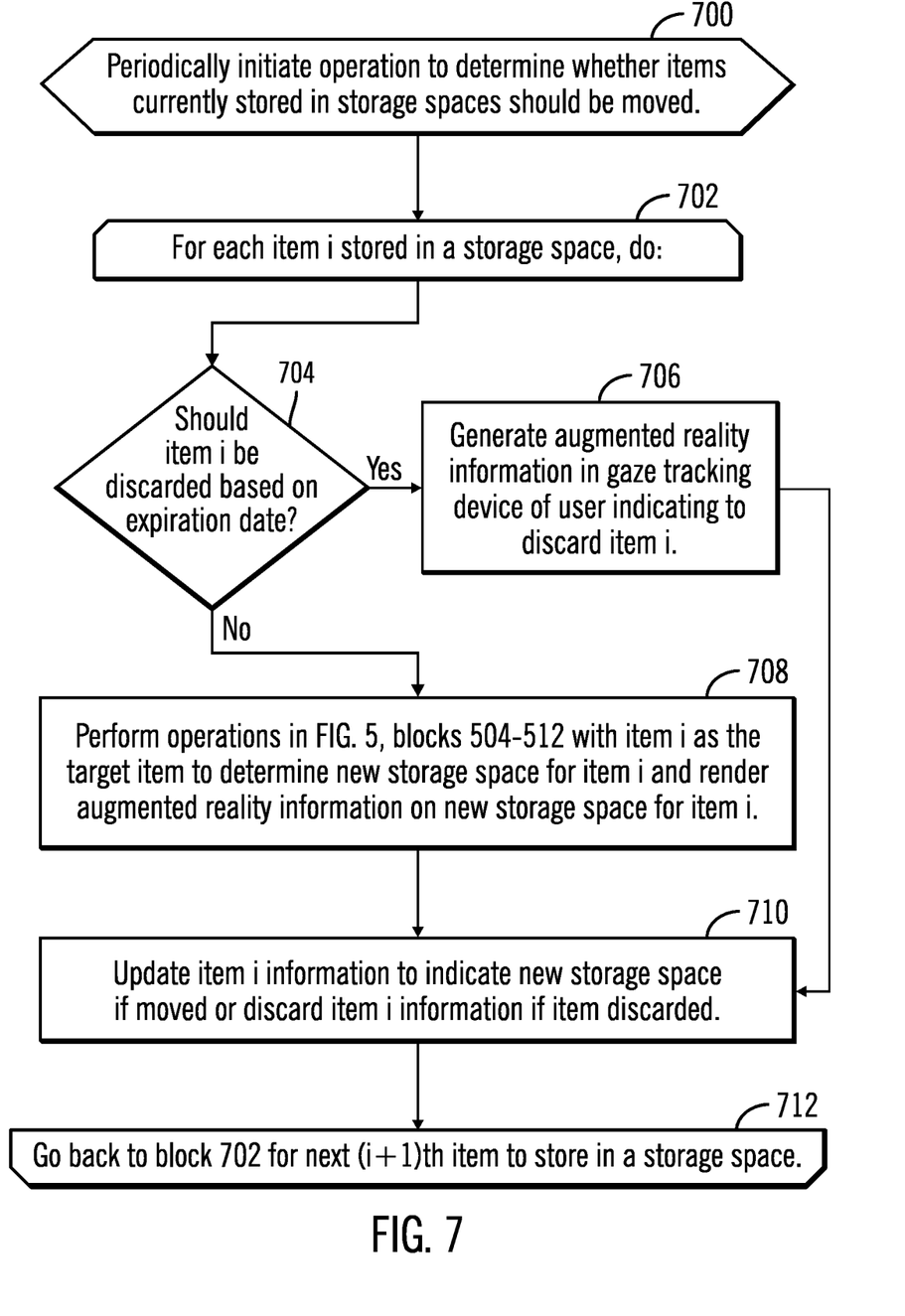
FIG. 7 illustrates an embodiment of operations to determine whether items currently stored in the storage spaces should be moved to another storage space or discarded.

FIG. 7 illustrates an embodiment of operations performed by the storage space manager program 124, predictive model 132, and augmented reality generator 144 to periodically determine whether items stored in the storage spaces should be discarded or moved to a more optimal storage space. Upon periodically initiating (at block 700) an operation to determine whether to change the placement of items in the storage spaces, the storage space manager 124 performs a loop of operations at blocks 702 through 712 for each item i stored in a storage space of the storage infrastructure. If (at block 704) item i should be discarded based on the expiration date 308 of the item, then the augmented reality generator 144 generates (at block 706) augmented reality information to render in the gaze tracking device 110 of the user indicating to discard item i, such as by superimposing the item to remove in the storage space in which the item is stored. If (at block 704) the item should not be discarded, then the predictive model 132 performs operations at blocks 504-512 in FIG. 5 with item i as the target item to determine new storage space for item i and render augmented reality information on new storage space for item i, such as by superimposing an augmented reality representation of item i in the determined new storage space. The storage space manager 124 updates (at block 710) item i information $300_i$ to indicate new storage space in field 317 if moved or if discarded, then delete the item information $300_i$ for the item to discarded when the user discards.

With the embodiment of operations of FIG. 7, the predictive model 132 is periodically used to determine whether items should be moved to a new storage based on changing factors for the item, such as access frequency 312, expiration date 308 and/or changes in the storage space storing the item, such as environmental attributes 210, access frequency 218, security, preferred item classifications 224, etc. This allows the predictive model 132 to recommend reorganization of the items stored in the storage spaces in an optimal manner based on current values in the storage space information $200_i$ and item information $300_i$ for the item being considered.

In another example, if the storage infrastructure comprises an industrial warehouse, the operations of FIG. 7 may detect that an item which is frequently accessed but not stored in an accessible location be moved to an easily accessible storage space.

Yet further, the preferred item classification 224 in storage space information $200_i$ for a storage space may be updated based on the determined new items suitable for the storage space and remove items not determined to be optimal for the storage space.

Figure 8:
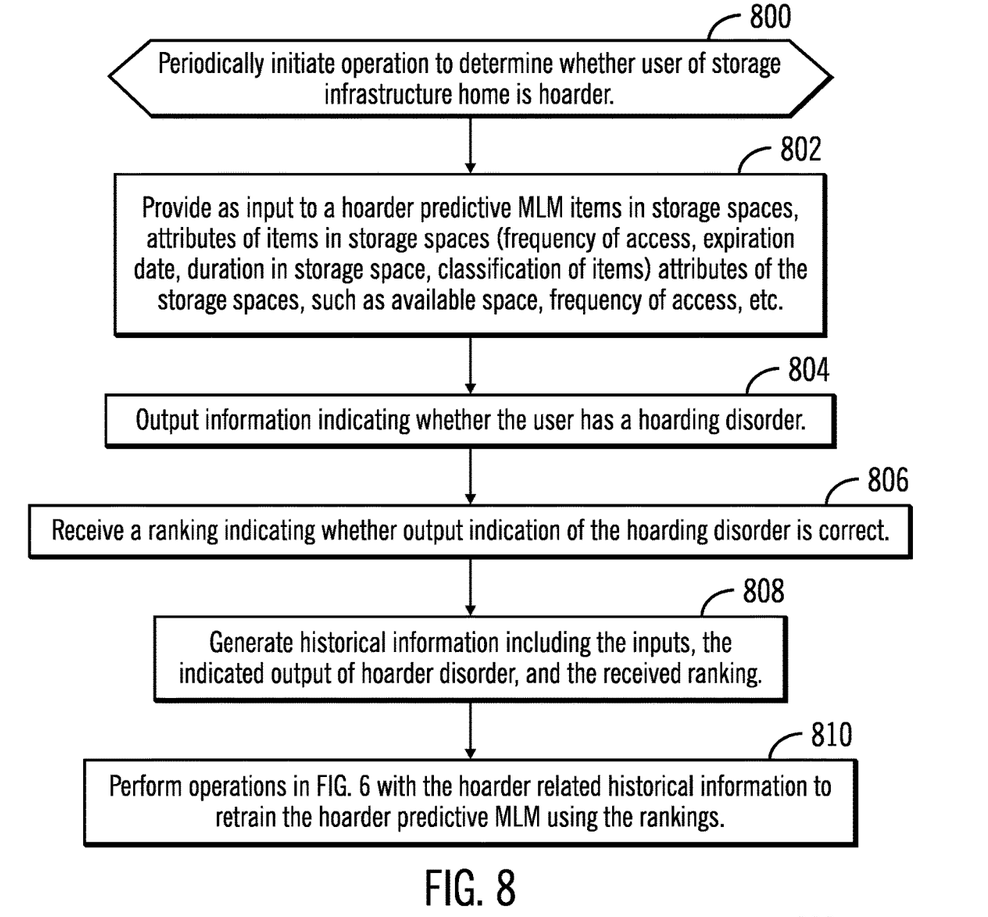
FIG. 8 illustrates an embodiment of operations to determine whether a user of the storage infrastructure has a hoarding disorder.

FIG. 8 illustrates an embodiment of operations performed by the storage space manager program 124 and the hoarder predictive MLM 148 to output indication of whether a user of the storage infrastructure has a hoarder disorder based on the pattern of how they store items in the storage spaces. storing too many things without using. Upon periodically initiating (at block 800) an operation to determine whether the user of the storage infrastructure is a hoarder, the storage space manager 124 provides (at block 802) as input to the hoarder predictive MLM 148 information on the items in the storage spaces, attributes of items in storage spaces (frequency of access 312 expiration date 308, duration in storage space, classification 306 of items, etc.) and attributes of the storage spaces, such as available space 212, frequency of access 218, etc. The hoarder predictive MLM 148 outputs (at block 804) information indicating whether the user of the storage infrastructure has a hoarding disorder.

Upon receiving (at block 806) indication of whether the output of whether the user has the hoarder disorder is correct, such as from a medical health professional, the storage space manager 124 may generate (at block 808) historical information $400_i$ including the inputs, the indicated determination of presence or absence of a hoarding disorder with a confidence level, and the received ranking. The storage space manager 124 and the hoarder predictive MLM 148 performs (at block 810) the training operations in FIG. 6 with the hoarder related historical information to retrain the hoarder predictive MLM 148 using the rankings.

With the embodiment of operations of FIG. 8, the information on the items and the storage spaces may also inputted to MLM 148 to determine whether the user of the infrastructure has a hoarding disorder. This tool may assist medical health professionals in diagnosing patients as to whether they have a hoarding disorder based on real time data collected about the storage of items in storage spaces in their home or other storage infrastructure. The MLM 148 may further consider personal health parameters of the user, such as mental conditions, to determine whether the user of the infrastructure has hoarding disorder based on their personal mental state as well as the state of the storage infrastructure.

Figure 9:
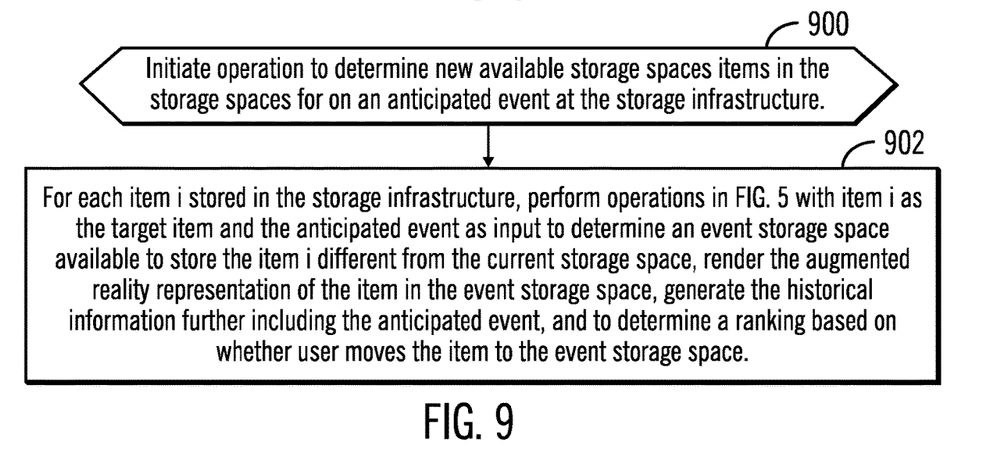
FIG. 9 illustrates an embodiment of operations to determine new storage spaces for items stored in the storage infrastructure for an anticipated event.

FIG. 9 illustrates an embodiment of operations performed by the storage space manager 124, predictive model 132, and augmented reality generator 144 to determine new available storage spaces for items in the storage spaces for an anticipated event at the storage infrastructure. For instance, if there is a severe weather event, such as a storm, the user of the storage infrastructure may want to move certain items to different protected locations. If there is a large party or other gathering in which there may be attendees unknown to the party organizer or which will have a rowdy crowd such as children or young adults, then the user of the storage infrastructure may want to move certain valuables and fragile items to more protected and secure storage space. Upon initiating (at block 900) an operation to determine new available storage spaces for an anticipated event at the storage infrastructure, the storage space manager 124, predictive model 132, and augmented reality generator 144 performs, for each item i stored in the storage infrastructure, the operations in FIG. 5 with item i as the target item and the anticipated event 140 as input to determine an event storage space 142 available to store the item i different from the current storage space, render the augmented reality representation of the item in the event storage space 142, generate the historical information $400_i$ further including the anticipated event, and to determine a ranking based on whether the user moves the item to the event storage space 142.

With the embodiment of operations of FIG. 9, the predictive model 132 is used to determine whether items should be relocated to new storage spaces for an anticipated event to allow the user to decide whether or not to move to an output event storage space 142. The predictive model 132 may be retrained with information on whether or not the user moved the items to event storage spaces 142 for an anticipated event that also considers as input the anticipated event. In this way, the system may consider external factors such as weather or guests visit and identify item displacements. For instance, if item information indicates an item is sensitive to moisture in the atmosphere, the output event storage space may be in an area with low humidity. Further, storage spaces indicated as safe 220 and not easily accessible 222 may be outputted for fragile and valuable items when there are many potentially rowdy or untrustworthy guests.

In a further embodiment, a determination may be made of a storage space storing less than a threshold number of items for the storage space. In such case, the predictive model 132 may be used to determine items to store in the relatively empty storage spaces. For such restocking purposes, the predictive model 132 may receive as input information on items previously stored in the determined storage space, attributes of the items, and the attributes of the determined storage space. The predictive model 132 may then process these inputs and output a plurality of items to store in the determined storage space. The augmented reality generator 144 may generate augmented reality representation of the outputted items superimposed over the determined storage space in the gaze tracking device 110 of the user.

In a yet further embodiment, the operations of FIG. 7 may generate insights for stock discrepancies, expiry of items, and inventory details for the augmented reality based virtual shelving. For instance, a physical space or rack may be conceptualized as comprising virtual sections within the physical sections and the dimensions of the virtual sections their dimensions may be determined by the proposed system based on learning, personalization and usage. The augmented reality generator may provide a presentation of virtual spacing within the physical space in which items may be placed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
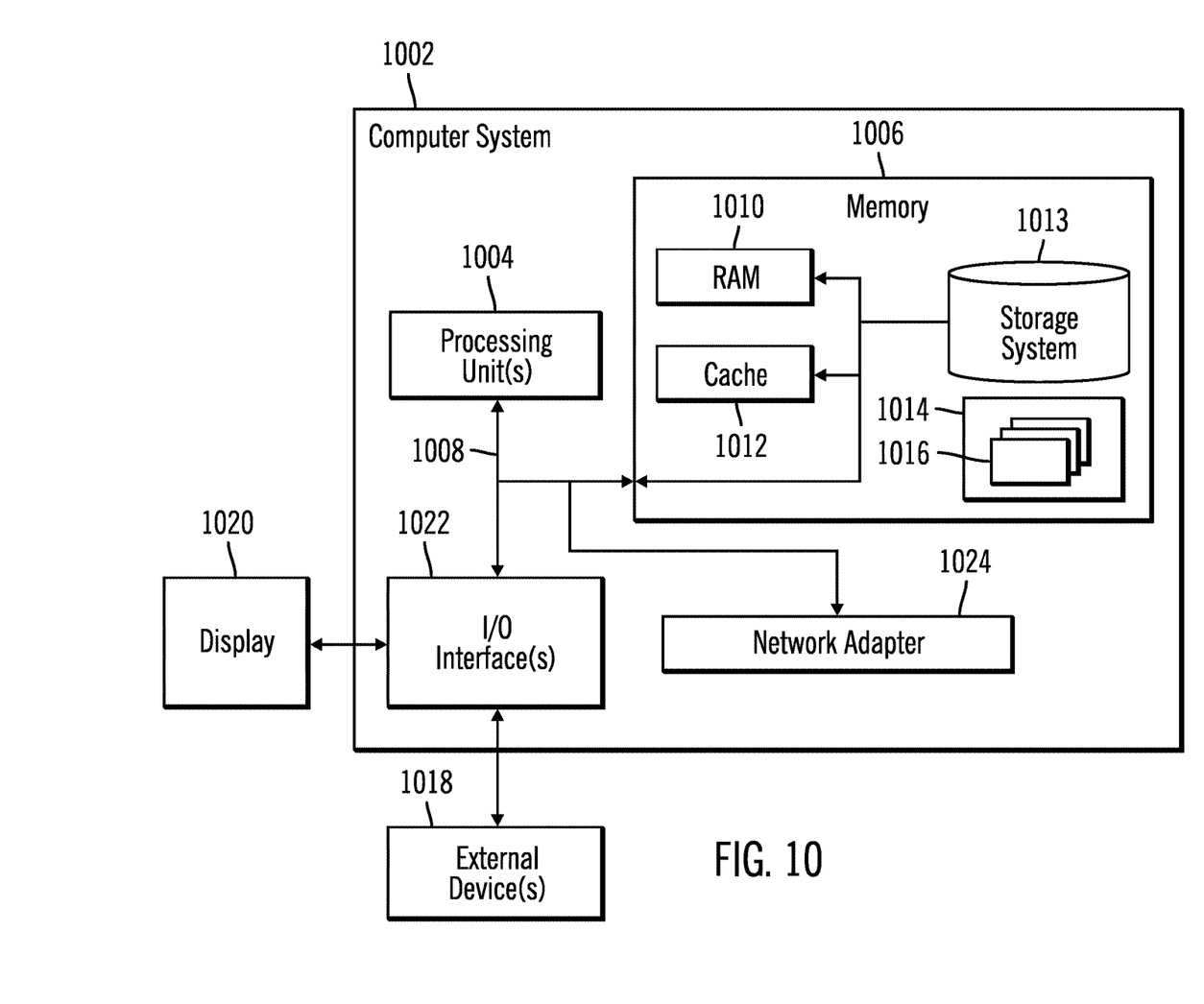
FIG. 10 illustrates a computing environment in which the components of FIG. 1 may be implemented.

The computational components of FIG. 1, including the storage space manager 100, gaze tracking device 110, and storage space IoT monitors 150 may be implemented with one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining location of item placement at a storage infrastructure, the computer program product comprising a computer readable storage medium having computer readable program code embodied therein that executes to perform operations, the operations comprising:
   providing information on the storage infrastructure indicating storage spaces in the storage infrastructure, including physical configurations indicating dimensions of the storage spaces in which items are placed, usages of the storage spaces, items placed in the storage spaces, and a predictive model used to determine storage spaces for items to store in the storage spaces;
   providing predetermined attributes for item classifications produced by a classifier machine learning model, wherein the predetermined attributes for an item classification include storage requirements of the item classification unrelated to dimensions of a target item to add to the storage spaces;
   outputting, by the classifier machine learning model, an item classification for the target item to add to the storage spaces;
   determining target item predetermined attributes for the item classification of the target item, from the predetermined attributes for the item classifications, including dimensions of the target item and a storage requirement unrelated to the dimensions of the target item;
   receiving, by the predictive model, as inputs, the target item predetermined attributes, the physical configurations of the storage spaces including the dimensions of the storage spaces, attributes of the storage spaces, and the usages of the storage spaces;
   processing, by the predictive model, the inputs to output an available storage space to optimize storage of the target item; and
   generating, in a computer display, an augmented reality representation of the target item superimposed in the available storage space.

2. The computer program product of claim 1, wherein the computer display comprises a gaze tracking device, and wherein the augmented reality representation of information comprises rendering a graphical representation of the target item in the gaze tracking device superimposed over the available storage space.

3. The computer program product of claim 1, wherein the target item predetermined attributes provided as input to the predictive model include at least a plurality of a storage classification of the storage spaces, physical locations and boundaries of the storage spaces, environmental properties of the storage spaces, and current usages of the storage spaces.

4. The computer program product of claim 3, wherein the operations further comprise:
   providing, as further input to the predictive model, physical attributes of a user of the storage infrastructure related to accessibility attributes of the storage spaces to determine the available storage space.

5. The computer program product of claim 1, wherein the target item predetermined attributes are selected from the group consisting of: a temperature requirement of the target item, a humidity requirement of the target item, a frequency of access of the target item, and wherein the attributes of the storage spaces provided as input to the predictive model further includes security of the storage spaces, accessibility, and visibility of the storage spaces.

6. The computer program product of claim 1, wherein the predictive model comprises a machine learning module, and wherein the operations further comprise:
   maintaining historical information on the inputs to the predictive model, the output available storage space, and rankings of appropriateness of storage spaces in which the items are stored;
   generating a positive training set of the storage spaces and items placed in the storage spaces having rankings exceeding an appropriateness threshold;
   generating a negative training set of the storage spaces and the items in the storage spaces having the rankings falling below the appropriateness threshold;
   training the predictive model to output the storage spaces determined for target items in the positive training set with a high confidence level; and
   training the predictive model to output the storage spaces for target items in the negative training set with a low confidence level.

7. The computer program product of claim 6, wherein the operations further comprise:
   determining whether a user placed the target item in the output available storage space, wherein a ranking of the output available storage space for the target item is set to a high ranking in response to the user placing the target item in the output available storage space, and wherein the ranking of the output available storage space for the target item is set to a low ranking in response to the user placing the target item in a storage space different from the output available storage space.

8. The computer program product of claim 1, wherein the operations further comprise:
   selecting an item stored in a storage space;
   processing, by the predictive model, attributes of the selected item, including a duration the selected item is placed in the storage space, frequency of access of the item during the duration the item was placed in the storage space, the usages of the storage spaces to determine a new storage space to store the selected item to optimize storage; and generating, in the computer display, an augmented reality representation of information on the new storage space for the selected item.

9. The computer program product of claim 1, wherein the operations further comprise:

processing, by a hoarder predictive machine learning module, attributes of items stored in the storage spaces, including an expiration date of the items stored in the storage spaces and a frequency of access of the items stored in the storage spaces, and the physical configurations of the storage spaces to determine a confidence level a user of the storage infrastructure has a hoarding disorder;

outputting information indicating whether the user has the hoarding disorder;

training the hoarder predictive machine learning module with the attributes of the items stored in the storage spaces and the physical configurations of the storage spaces to output indication the user has the hoarding disorder with a higher confidence level than the determined confidence level in response to received information indicating the user has the hoarding disorder; and training the hoarder predictive machine learning module with the attributes of the items stored in the storage spaces and the physical configurations of the storage spaces to output indication the user has the hoarding disorder with a lower confidence level than the determined confidence level in response to received information indicating the user does not have the hoarding disorder.

10. The computer program product of claim 1, wherein the operations further comprise:

determining a storage space storing less than a threshold number of items for the storage space;

receiving as input, by the predictive model, information on items previously stored in the determined storage space, attributes of the items, and the attributes of the determined storage space;

outputting, by the predictive model processing the input, a plurality of items to store in the determined storage space; and generating, in the computer display, an augmented reality representation of the outputted items superimposed over the determined storage space.

11. The computer program product of claim 1, wherein the operations further comprise:

training the predictive model to process inputs for the storage spaces, items currently stored in the storage spaces and an anticipated event to occur affecting the storage infrastructure and output event storage spaces to store during the anticipated event at least one of the items currently stored in the storage spaces;

receiving, by the predictive model, as inputs an anticipated event, attributes of the items currently stored in the storage spaces, attributes of the storage spaces, and the usages of the storage spaces;

processing, by the predictive model, the inputs to output an event storage space for an item currently stored in a storage space that differs from the event storage space; and generating, in the computer display, an augmented reality representation of information on the event storage space to use for the item currently stored in the storage space different from the event storage space.

12. The computer program product of claim 1, wherein the target item predetermined attributes unrelated to the dimensions of the target item are selected from the group consisting of: an expiration date; historical access frequency; a temperature storage requirement; a humidity storage requirement; a light exposure storage requirement; a security storage requirement; and a visibility storage requirement.

13. A system for determining location of item placement at a storage infrastructure, comprising:

a processor; and a computer readable storage medium having computer readable program code that when executed by the processor performs operations, the operations comprising:

providing information on the storage infrastructure indicating storage spaces in the storage infrastructure, including physical configurations indicating dimensions of the storage spaces in which items are placed, usages of the storage spaces, items placed in the storage spaces, and a predictive model used to determine storage spaces for items to store in the storage spaces;

providing predetermined attributes for item classifications produced by a classifier machine learning model, wherein the predetermined attributes for an item classification include storage requirements of the item classification unrelated to dimensions of a target item to add to the storage spaces;

outputting, by the classifier machine learning model, an item classification for the target item to add to the storage spaces;

determining target item predetermined attributes for the item classification of the target item, from the predetermined attributes for the item classifications, including dimensions of the target item and a storage requirement unrelated to the dimensions of the target item;

receiving, by the predictive model, as inputs, the target item predetermined attributes, the physical configurations of the storage spaces including the dimensions of the storage spaces, attributes of the storage spaces, and the usages of the storage spaces;

processing, by the predictive model, the inputs to output an available storage space to optimize storage of the target item; and generating, in a computer display, an augmented reality representation of the target item superimposed in the available storage space.

14. The system of claim 13, wherein the predictive model comprises a machine learning module, and wherein the operations further comprise:

maintaining historical information on the inputs to the predictive model, the output available storage space, and rankings of appropriateness of storage spaces in which the items are stored;

generating a positive training set of the storage spaces and items placed in the storage spaces having rankings exceeding an appropriateness threshold;

generating a negative training set of the storage spaces and the items in the storage spaces having the rankings falling below the appropriateness threshold;

training the predictive model to output the storage spaces determined for target items in the positive training set with a high confidence level; and training the predictive model to output the storage spaces for target items in the negative training set with a low confidence level.

15. The system of claim 14, wherein the operations further comprise:
determining whether a user placed the target item in the output available storage space, wherein a ranking of the output available storage space for the target item is set to a high ranking in response to the user placing the target item in the output available storage space, and wherein the ranking of the output available storage space for the target item is set to a low ranking in response to the user placing the target item in a storage space different from the output available storage space.

16. The system of claim 13, wherein the operations further comprise:
selecting an item stored in a storage space;
processing, by the predictive model, attributes of the selected item, including a duration the selected item is placed in the storage space, frequency of access of the item during the duration the item was placed in the storage space, the usages of the storage spaces to determine a new storage space to store the selected item to optimize storage; and
generating, in the computer display, an augmented reality representation of information on the new storage space for the selected item.

17. The system of claim 13, wherein the operations further comprise:
training the predictive model to process inputs for the storage spaces, items currently stored in the storage spaces and an anticipated event to occur affecting the storage infrastructure and output event storage spaces to store during the anticipated event at least one of the items currently stored in the storage spaces;
receiving, by the predictive model, as inputs an anticipated event, attributes of the items currently stored in the storage spaces, attributes of the storage spaces, and the usages of the storage spaces;
processing, by the predictive model, the inputs to output an event storage space for an item currently stored in a storage space that differs from the event storage space; and
generating, in the computer display, an augmented reality representation of information on the event storage space to use for the item currently stored in the storage space different from the event storage space.

18. The system of claim 13, wherein the target item predetermined attributes unrelated to the dimensions of the target item are selected from the group consisting of: an expiration date; historical access frequency; a temperature storage requirement; a humidity storage requirement; a light exposure storage requirement; a security storage requirement; and a visibility storage requirement.

19. A computer implemented method for determining location of item placement at a storage infrastructure, comprising:
providing, in a computer system, information on the storage infrastructure indicating storage spaces in the storage infrastructure, including physical configurations indicating dimensions of the storage spaces in which items are placed, usages of the storage spaces, items placed in the storage spaces, and a predictive model used to determine storage spaces for items to store in the storage spaces;
providing, in the computer system, predetermined attributes for item classifications produced by a classifier machine learning model, wherein the predetermined attributes for an item classification include storage requirements of the item classification unrelated to dimensions of a target item to add to the storage spaces;
outputting, by the classifier machine learning model, an item classification for the target item to add to the storage spaces;
determining, in the computer system, target item predetermined attributes for the item classification of the target item, from the predetermined attributes for the item classifications, including dimensions of the target item and a storage requirement unrelated to the dimensions of the target item;
receiving, by the predictive model, as inputs, the target item predetermined attributes, the physical configurations of the storage spaces including the dimensions of the storage spaces, attributes of the storage spaces, and the usages of the storage spaces;
processing, by the predictive model, the inputs to output an available storage space to optimize storage of the target item; and
generating, in a computer display, an augmented reality representation of the target item superimposed in the available storage space.

20. The method of claim 19, wherein the predictive model comprises a machine learning module, further comprising:
maintaining historical information on the inputs to the predictive model, the output available storage space, and rankings of appropriateness of storage spaces in which the items are stored;
generating a positive training set of the storage spaces and items placed in the storage spaces having rankings exceeding an appropriateness threshold;
generating a negative training set of the storage spaces and the items in the storage spaces having the rankings falling below the appropriateness threshold;
training the predictive model to output the storage spaces determined for target items in the positive training set with a high confidence level; and
training the predictive model to output the storage spaces for target items in the negative training set with a low confidence level.

21. The method of claim 19, further comprising:
selecting an item stored in a storage space;
processing, by the predictive model, attributes of the selected item, including a duration the selected item is placed in the storage space, frequency of access of the item during the duration the item was placed in the storage space, the usages of the storage spaces to determine a new storage space to store the selected item to optimize storage; and
generating, in the computer display, an augmented reality representation of information on the new storage space for the selected item.

22. The method of claim 19, further comprising:
training the predictive model to process inputs for the storage spaces, items currently stored in the storage spaces and an anticipated event to occur affecting the storage infrastructure and output event storage spaces to store during the anticipated event at least one of the items currently stored in the storage spaces;
receiving, by the predictive model, as inputs an anticipated event, attributes of the items currently stored in the storage spaces, attributes of the storage spaces, and the usages of the storage spaces;

processing, by the predictive model, the inputs to output an event storage space for an item currently stored in a storage space that differs from the event storage space; and generating, in the computer display, an augmented reality representation of information on the event storage space to use for the item currently stored in the storage space different from the event storage space.

23. The method of claim 19, wherein the target item predetermined attributes unrelated to the dimensions of the target item are selected from the group consisting of: an expiration date; historical access frequency; a temperature storage requirement; a humidity storage requirement; a light exposure storage requirement; a security storage requirement; and a visibility storage requirement.

* * * * *